(12) United States Patent
Singh (10) Patent No.: US 10,172,073 B2
(45) Date of Patent: Jan. 1, 2019

(54) SYSTEMS AND METHODS FOR LOCAL-AREA-NETWORK-ASSISTED LOCATION DETERMINATION

(71) Applicant: Telcom Ventures, L.L.C., Miami, FL (US)

(72) Inventor: Rajendra Singh, Indian Creek Village, FL (US)

(73) Assignee: Telcom Ventures, LLC, Miami, FL (US)

(*) Notice: Subject to any disclaimer, the term of this patent is extended or adjusted under 35 U.S.C. 154(b) by 546 days.

(21) Appl. No.: 13/864,575

(22) Filed: Apr. 17, 2013

(65) Prior Publication Data

US 2013/0279488 A1 Oct. 24, 2013

Related U.S. Application Data

(60) Provisional application No. 61/635,060, filed on Apr. 18, 2012.

(51) Int. Cl.
| | |
|---|---|
| *H04W 64/00* | (2009.01) |
| *G01S 19/01* | (2010.01) |
| *H04W 48/16* | (2009.01) |
| *H04W 4/02* | (2018.01) |
| *H04W 4/20* | (2018.01) |
| *G01S 5/00* | (2006.01) |
| *G01S 5/02* | (2010.01) |
| *H04W 4/80* | (2018.01) |
| *H04W 48/12* | (2009.01) |

(52) U.S. Cl.
CPC ........... *H04W 48/16* (2013.01); *G01S 5/0063* (2013.01); *G01S 5/0242* (2013.01); *G01S 5/0252* (2013.01); *H04W 4/02* (2013.01); *H04W 4/20* (2013.01); *H04W 4/80* (2018.02); *H04W 48/12* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 8,629,803 B2 | 1/2014 | Pattabiraman et al. | |
| 8,688,139 B2 * | 4/2014 | Garin et al. | 455/456.1 |

(Continued)

FOREIGN PATENT DOCUMENTS

| | | |
|---|---|---|
| EP | 2200383 A1 | 6/2010 |
| JP | 2008-519495 A | 6/2008 |

(Continued)

OTHER PUBLICATIONS

Written Opinion of the International Preliminary Examining Authority, in corresponding PCT Application No. PCT/US2013/036914, dated Aug. 8, 2014 (5 pages).

(Continued)

*Primary Examiner* — Duc T Duong
(74) *Attorney, Agent, or Firm* — Myers Bigel, P.A.

(57) ABSTRACT

Wi-Fi-based location determination methods may include receiving location information and/or identifier information regarding a Wi-Fi hot spot, at a database. The methods may include transmitting the location information and/or identifier information regarding the Wi-Fi hot spot, from the database to a positioning receiver. Related systems are also described.

9 Claims, 5 Drawing Sheets

(56) References Cited

U.S. PATENT DOCUMENTS

| | | | |
|---|---|---|---|
| 9,797,982 B2* | 10/2017 | Sendonaris | G01S 5/0226 |
| 2005/0037775 A1* | 2/2005 | Moeglein | G01S 5/0036 |
| | | | 455/456.1 |
| 2005/0282558 A1* | 12/2005 | Choi | G01S 13/878 |
| | | | 455/456.1 |
| 2006/0095348 A1* | 5/2006 | Jones et al. | 705/29 |
| 2007/0121560 A1* | 5/2007 | Edge | 370/338 |
| 2007/0167173 A1 | 7/2007 | Halcrow et al. | |
| 2007/0167174 A1* | 7/2007 | Halcrow et al. | 455/456.2 |
| 2007/0297355 A1 | 12/2007 | Jendbro et al. | |
| 2008/0151843 A1* | 6/2008 | Valmikam et al. | 370/338 |
| 2008/0248813 A1* | 10/2008 | Chatterjee | 455/456.2 |
| 2008/0309508 A1* | 12/2008 | Harmon | 340/686.1 |
| 2009/0310585 A1* | 12/2009 | Alizadeh-Shabdiz | 370/338 |
| 2011/0103360 A1 | 5/2011 | Ku et al. | |
| 2011/0202576 A1* | 8/2011 | Seshadri | G06F 17/30578 |
| | | | 707/812 |
| 2011/0250903 A1* | 10/2011 | Huang et al. | 455/456.1 |
| 2012/0188938 A1* | 7/2012 | Venkatraman | H04W 64/003 |
| | | | 370/328 |
| 2012/0327922 A1* | 12/2012 | Takahashi et al. | 370/338 |
| 2013/0235749 A1* | 9/2013 | Cho et al. | 370/252 |
| 2013/0267242 A1* | 10/2013 | Curticapean | H04W 64/003 |
| | | | 455/456.1 |

FOREIGN PATENT DOCUMENTS

| | | |
|---|---|---|
| JP | 2008-536348 A | 9/2008 |
| JP | 2009-542060 A | 11/2009 |
| JP | 2010-159980 | 7/2010 |
| JP | 2011-099859 A | 5/2011 |
| JP | 2011-145873 A | 7/2011 |
| JP | 2011-247738 | 12/2011 |
| JP | 2012-063322 A | 3/2012 |
| WO | WO 2006014439 A2 | 2/2006 |
| WO | WO 2007081395 A1 | 7/2007 |

OTHER PUBLICATIONS

Notification Concerning Transmittal of International Preliminary Report on Patentability in corresponding PCT Application No. PCT/US2013/036914 dated Sep. 22, 2014 (7 pages).
Notification of Transmittal of the International Search Report and the Written Opinion of the International Searching Authority, or the Declaration, PCT/US2013/036914, dated Dec. 5, 2013.
Japanese Office Action Corresponding to Japanese Patent Application No. 2015-507139; dated Dec. 2, 2016; Foreign Text, 7 Pages, English Translation Thereof, 6 Pages.

* cited by examiner

SYSTEMS AND METHODS FOR LOCAL-AREA-NETWORK-ASSISTED LOCATION DETERMINATION

CLAIM OF PRIORITY

The present application claims the benefit of U.S. Provisional Patent Application Ser. No. 61/635,060, filed Apr. 18, 2012, entitled Systems and Methods for Local-Area-Network-Assisted Location Determination, the disclosure of which is incorporated herein in its entirety by reference.

FIELD

The present disclosure relates to wireless communications systems and methods, and more particularly to location determination systems and methods.

BACKGROUND

Global Positioning System (GPS) technology has become widely used in mobile phones to provide location determination for the mobile/cell phones. GPS technology, however, may be less effective inside buildings and in heavily-built-up urban canyons. Therefore, various technologies have been used to assist GPS technology in difficult-to-cover areas. Some systems, such as Bluetooth and Near-Field Communication (NFC), may be used in limited (e.g., short-range) areas. Other systems, such as Wi-Fi hot spots, may provide longer range than Bluetooth or NFC and have been widely used to assist GPS in location determination.

In using Wi-Fi to assist GPS, a priori mapping of Wi-Fi hot spots may be carried out either through (a) drive tests or (b) crowd-sourcing. In the case of (a) drive tests, a test van may drive through the streets and collect a given Wi-Fi hot spot's location and identifier information. In the case of (b) crowd-sourcing, these functions may be carried out by the mobile/cell phone users that form the crowd. For example, a mobile/cell phone may collect the Wi-Fi hot spot's location and identifier information, and may transmit the location and identifier information via a cellular network to a central database where it can be used in the future. Both the (a) drive-testing approach and the (b) crowd-sourcing approach may have drawbacks, however.

Examples of such drawbacks include:
1. A mobile/cell phone that wants to determine its location may have to collect the Wi-Fi hot spot's identifier (or the identifiers of multiple nearby hot spots) and then transmit the identifier(s) via a cellular network to the central database. The central database then calculates the location, and transmits it to the mobile/cell phone via the cellular network. This process may take away from cellular network resources (e.g., network signaling resources). As such usage increases, this can be a significant burden on the cellular network resources.
2. A database (e.g., the central database) of Wi-Fi hot spots may need to be maintained over time. If maintenance of the database is performed using drive tests, then it may be a manual, cumbersome, and costly process. If it is performed using crowd-sourcing, then it may take away from cellular network resources.
3. Crowd-sourcing techniques may generate privacy concerns. Although such concerns can be addressed to some extent by a database administrator, privacy can still be subject to abuse.
4. None of these approaches addresses sudden changes in the locations of Wi-Fi hot spots. Such changes can occur naturally as users move their Wi-Fi hot spots without notice and at any time. This problem may become quite significant as Wi-Fi hot spots become more portable. Although this may not be very common, it is expected that Wi-Fi hot spots may be moved to obtain additional range because the range provided with a mobile/cell phone may be limited due to transmit power.

SUMMARY

According to some embodiments, Wi-Fi-based location determination methods may include receiving location change information indicating a change in a location of a Wi-Fi hot spot, at a database. The methods may include transmitting the location change information from the database to a positioning receiver. Systems configured to perform the methods may also be provided.

In some embodiments, the location change information may be received and/or transmitted by the database via a non-cellular beacon network. Moreover, the location change information may be received at the database from a listening device that is separate from the positioning receiver. The location change information may be transmitted from the database after updating the database with the location change information. Additionally or alternatively, the location change information may be transmitted from the database to first and second positioning receivers.

According to some embodiments, methods of operating a positioning receiver may include receiving location change information indicating a change in a location of a Wi-Fi hot spot, at the positioning receiver. The methods may include calculating a position location of the positioning receiver, using one of: the location change information; or positioning signals received by the positioning receiver using a non-cellular beacon network. Positioning receivers configured to perform the methods may also be provided.

In some embodiments, the methods may include determining whether the positioning receiver has greater confidence in the location change information or in the positioning signals received by the positioning receiver using the non-cellular beacon network. Calculating the position location of the positioning receiver may thus include calculating the position location of the positioning receiver using the one of the location change information or the positioning signals received by the positioning receiver using the non-cellular beacon network in which the positioning receiver has the greater confidence. Moreover, receiving the location change information may include receiving the location change information at the positioning receiver, via a non-cellular beacon network.

According to some embodiments, Wi-Fi-based location determination methods may include receiving location information and/or identifier information regarding a Wi-Fi hot spot, at a database, via a non-cellular beacon network. The methods may include transmitting the location information and/or identifier information regarding the Wi-Fi hot spot, from the database to a positioning receiver. Systems configured to perform the methods may also be provided.

In some embodiments, transmitting the location information and/or identifier information may include transmitting the location information and/or identifier information regarding the Wi-Fi hot spot, from the database to the positioning receiver, via the non-cellular beacon network. The location information and/or identifier information may be transmitted after updating the database with the location information and/or identifier information regarding the Wi- Fi hot spot. Additionally or alternatively, the location information and/or identifier information regarding the Wi-Fi hot spot may be transmitted, from the database to first and second positioning receivers. Moreover, receiving the location information and/or identifier information may include receiving location information and/or identifier information regarding the Wi-Fi hot spot, at the database from a listening device separate from the positioning receiver. The location information and/or identifier information may indicate a change in a location of the Wi-Fi hot spot.

According to some embodiments, systems for Wi-Fi-based location determination may include a listening device configured to receive signals from a Wi-Fi hot spot. The listening device may be further configured to transmit location change information indicating a change in a status of the Wi-Fi hot spot, in response to detecting or failing to detect the signals from the Wi-Fi hot spot, via a non-cellular beacon network.

In some embodiments, the listening device may be configured to detect a strength of the signals from the Wi-Fi hot spot and to determine the change in the status of the Wi-Fi hot spot in response to the strength of the signals from the Wi-Fi hot spot. Moreover, the systems may include a database configured to receive the location change information from the listening device, via the non-cellular beacon network. The database may also be configured to transmit the location information and/or identifier information indicating the change in the status of the Wi-Fi hot spot, to a positioning receiver. The positioning receiver may be configured to receive the location change information from a database, via the non-cellular beacon network.

In some embodiments, the location change information may indicate a change in a location of the Wi-Fi hot spot. The positioning receiver may be configured to calculate a position location of the positioning receiver, using one of: the location change information; or positioning signals received by the positioning receiver using a non-cellular beacon network. The positioning receiver may be configured to determine whether the positioning receiver has greater confidence in the location change information or in the positioning signals received by the positioning receiver using the non-cellular beacon network. The positioning receiver may be configured to calculate the position location of the positioning receiver using the one of the location change information or the positioning signals received by the positioning receiver using the non-cellular beacon network in which the positioning receiver has the greater confidence.

In some embodiments, the systems may include first and second listening devices configured to receive the signals from the Wi-Fi hot spot, and configured to transmit the location change information in response to detecting or failing to detect the signals from the Wi-Fi hot spot.

DETAILED DESCRIPTION

Specific example embodiments of the invention now will be described with reference to the accompanying drawings.

This invention may, however, be embodied in a variety of different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled or responsive.

The terminology used herein is for the purpose of describing particular embodiments only and is not intended to be limiting of the invention. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present invention.

The present invention is described in part below with reference to block diagrams and flowcharts of methods and systems according to embodiments of the invention. A given block or blocks of the block diagrams and/or flowcharts provides support for methods and/or systems.

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

The systems and methods described herein address how to mitigate various problems associated with local-area-network-assisted location determination (e.g., Wi-Fi-assisted location determination). For example, the operations described herein may include three components: (1) data collection regarding Wi-Fi hot spots (e.g., personal, business, public, and/or private Wi-Fi hot-spots), (2) transmission of information from a database for Wi-Fi hot spots to one or more positioning receivers (e.g., mobile/cell phones or any other portable electronic devices capable of communicating with the database), and (3) performing/processing location determination at the individual positioning receiver(s).

Moreover, other technologies, such as Wide Area Positioning System (or Wide Area Position-location Service) (WAPS), are emerging. In a WAPS network/system, beacons are placed around a geographical area and transmit GPS-like signals. These signals can be used for location determination of various portable electronic user devices (including cell phones). The operations described herein can be used with or without a WAPS network/system.

Figure 1:
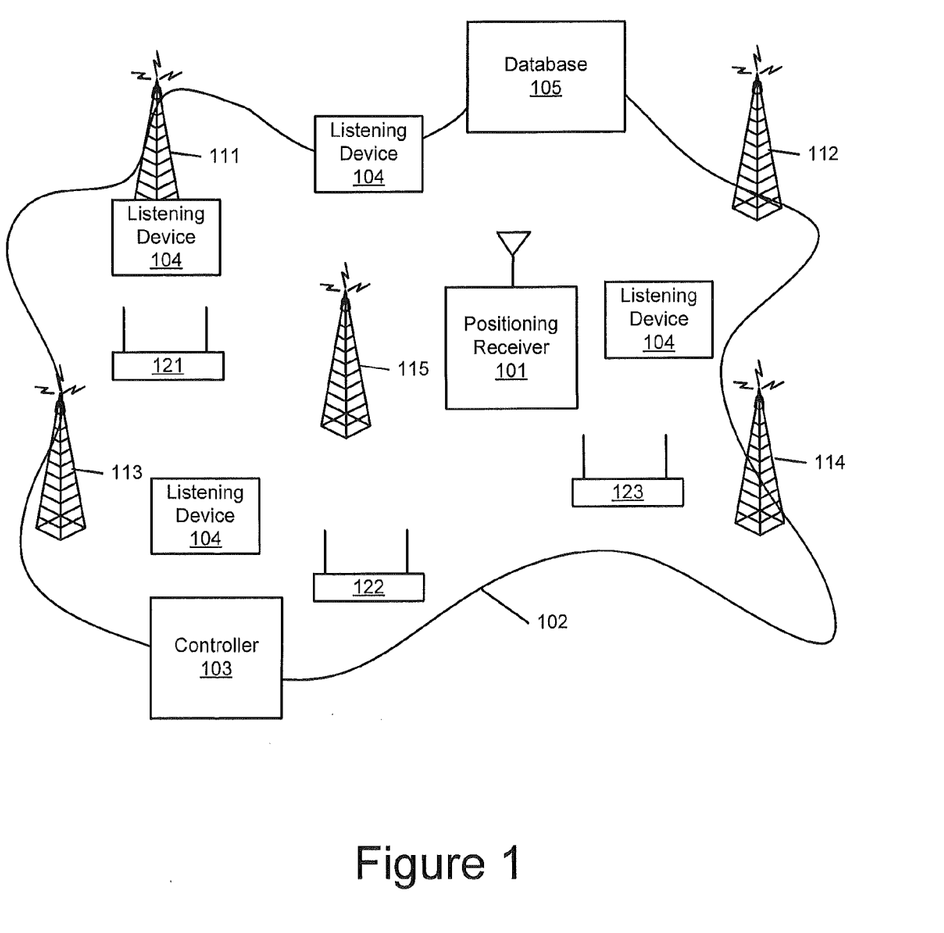
FIG. 1 is a schematic diagram illustrating a geographical area that includes a positioning receiver and at least one Wi-Fi hot spot, according to various embodiments described herein.

Referring now to FIG. 1, a terrestrial-based positioning receiver 101 (e.g., a "terrestrial receiver" or a "positioning receiver") is illustrated in a geographical area 102. The positioning receiver 101 may be (or may be a part of) one of various types of portable electronic user devices (including mobile/cell phones, as well as user devices without phone capabilities). The positioning receiver 101 can be located anywhere inside the geographical area 102 and, in particular, may be located in an area that has poor satellite reception, such as in a building or other shadowed location. Although FIG. 1 illustrates a single positioning receiver 101, a plurality of positioning receivers 101 may be located inside the geographical area 102. In some embodiments, hundreds, thousands, or more positioning receivers 101 may be located inside the geographical area 102.

Moreover, the positioning receiver(s) 101 may communicate with one or more Wi-Fi hot spots 121-123 within the geographical area 102. Although FIG. 1 illustrates the three Wi-Fi hot spots 121-123, geographical areas including more or fewer Wi-Fi hot spots will be understood by those skilled in the art. Additionally, one or more Listening Devices (LDs) 104 may be placed at various locations within the geographical coverage area 102 to detect/report on signals transmitted by the Wi-Fi hot spots 121-123.

Referring still to FIG. 1, a Terrestrial-based Beacon Network (TBN) that includes beacons 111-115 is also illustrated. Additionally, a controller 103 may control transmissions from one or more of the beacons 111-115. The controller 103 may be external/internal to one or more of the beacons 111-115. Although FIG. 1 illustrates the five beacons 111-115, TBNs including more or fewer beacons will be understood by those skilled in the art. Moreover, in some embodiments, the TBN including the beacons 111-115 may be a part of a WAPS network.

A plurality of the beacons 111-115 may cover the geographical area 102 to provide positioning signals to the positioning receiver 101 within the geographical area 102. In some embodiments, the positioning receiver 101 may include a GPS receiver, and the beacons 111-115 may provide GPS location assistance to the GPS receiver. Many of the beacons, such as the beacons 111-114, may be located at or near the boundary of the geographical area 102. Additionally, some beacons, such as the beacon 115, may be located well inside the geographical area 102.

1. Data Collection Regarding Wi-Fi Hot Spots

Data collection regarding the Wi-Fi hot spots in the geographical area 102 may be performed using a combination of drive tests, crowd-sourcing, and listening devices (e.g., the LDs 104). The LDs 104 may be installed at various locations in the geographical area 102. Locations of the LDs 104 may be distributed in a manner to provide real-time information to determine whether a Wi-Fi hot spot has moved. For example, FIG. 1 illustrates an LD 104 that is a part of the beacon 111, as well as other LDs 104 that are separate from the beacons 111-115. The LDs 104 can use omni-directional antennas or they can use directional/smart antennas to increase the distance over which they can listen. Also, the number of LDs 104 deployed in the geographical area 102 can be reduced if the range over which they can listen is increased.

One example of detecting a status change of a Wi-Fi hot spot is determining that the Wi-Fi hot spot (e.g., the Wi-Fi hot spot 123 illustrated in FIG. 1) has moved based on a change in the detected signal strength of the Wi-Fi hot spot 123, The change in the detected signal strength may be indicated by, for example, the absence of any detected signal from the Wi-Fi hot spot 123 at an LD 104 that previously detected signals from the Wi-Fi hot spot 123. Alternatively, the change in the detected signal strength may be indicated by a reduction (but not a total absence) of the strength of signals from the Wi-Fi hot spot 123 detected at an LD 104. Moreover, the change in the detected signal strength may be indicated by a change in the strength of signals detected from the Wi-Fi hot spot 123 relative to the strength of signals detected from the Wi-Fi hot spot 121 at an LD 104. In another example, it may be determined that the Wi-Fi hot spot 123 has moved if the Wi-Fi hot spot 123 is detected by a different LD 104 (i.e., an LD 104 that did not previously detect the Wi-Fi hot spot 123). Such changes in the status of the Wi-Fi hot spot 123 are reported to a central location (e.g., a central database 105 for the Wi-Fi hot spots 121-123).

According to various embodiments, only changes are reported to the central database 105. In other words, network signaling capacity (e.g., for the WAPS/cellular/other network that is used to report the changes) may be conserved by only transmitting changes in the status of the Wi-Fi hot spot 123, rather than repeatedly transmitting the status regardless of whether the Wi-Fi hot spot 123 has moved.

Moreover, these operations of collecting and reporting/transmitting Wi-Fi hot spot information can be used in conjunction with drive-testing and/or crowd-sourcing. Additionally, these operations can be used over an entire geographical area (e.g., the entire geographical area 102) or only over the areas where significant problems are expected (i.e., areas in which a change in the location of the Wi-Fi hot spot 123 over time is expected).

Furthermore, crowd-sourcing can be used in conjunction with a WAPS system (e.g., a WAPS system using beacons such as the beacons 111-115). A WAPS system may be able to provide the location of the positioning receiver 101 inside a building or in an urban canyon, even when GPS cannot. With crowd-sourcing, cell phones (or other portable electronic user devices) that are equipped with WAPS capability may be able to determine/detect whether the location of a Wi-Fi hot spot (e.g., the Wi-Fi hot spot 123) has changed and report such changes via the WAPS system to the central database 105. The cell phones may also be able to transmit the signal strength/identifier of the Wi-Fi hot spot 123, along with their own location, from the WAPS system to the central database 105. Accordingly, cell phones used for crowd-sourcing can transmit information regarding Wi-Fi hot spots via the WAPS system rather than using the network resources of a cellular system to transmit this information.

Although WAPS-equipped devices (e.g., cell phones and other portable electronic devices) can determine their own locations (e.g., using positioning signals transmitted by the WAPS network/system), a Wi-Fi hot spot may still be helpful for location determination because, depending on the location of WAPS beacons and topology, a Wi-Fi-hot-spotbased method for location determination may be more accurate than a WAPS method alone. Accordingly, it may be useful to use both methods to obtain the best results for position location determination.

2. Transmission of Information from a Database for Wi-Fi Hot Spots to Positioning Receivers If the central database 105, an LD 104, and/or a remote cell phone (or other portable electronic user device) determines that the status of a Wi-Fi hot spot location has changed, then this status change needs to be communicated to all positioning receivers 101 that make their own position location calculations. In other words, the positioning receivers 101 themselves may calculate their position locations using status change information transmitted by the central database 105. Although communication of the status change of a Wi-Fi hot spot location may not be essential if the central database 105 (rather than the positioning receivers 101) calculates the position locations, such communication of the status change may help to take full advantage of the operations described herein. The same is true if crowd-sourcing is used with WAPS and only changes are transmitted from the cell phones (or other portable electronic user devices) to the central database 105 to conserve network signaling capacity.

3. Calculation of Position Location

A cell phone (or another portable electronic user device) may store the location and identifier of Wi-Fi hot spots in its memory. For example, the positioning receiver 101 may store the location and identifier of the Wi-Fi hot spots 121-123 in its memory. This information is assumed to be current, as any changes in the locations of the Wi-Fi hot spots 121-123 are transmitted in real-time to all positioning receivers 101 on a broadcast channel, via a cell phone network, or via some other method, such as the Internet.

Along with the Wi-Fi hot spot location and identifier information, a "goodness" (e.g., accuracy/confidence) matrix can be stored in the positioning receiver 101. This goodness matrix can be determined using drive-testing, or using WAPS technology where there is a greater confidence in the WAPS technology. "Goodness" may be defined in terms of the location accuracy. In other words, the objective is to obtain the most precise fix for the location of the positioning receiver 101. The positioning receiver 101 may compare the "goodness" of the location information associated with a Wi-Fi hot spot (e.g., the Wi-Fi hot spot 123) with the "goodness" associated with another method such as WAPS. The positioning receiver 101 will select the method in which it has the most confidence. The selected method will not necessarily require the positioning receiver 101 to send information to the central database 105, or require the central database 105 to calculate the location and transmit it back to the positioning receiver 101 via a cellular network.

Figure 2A:
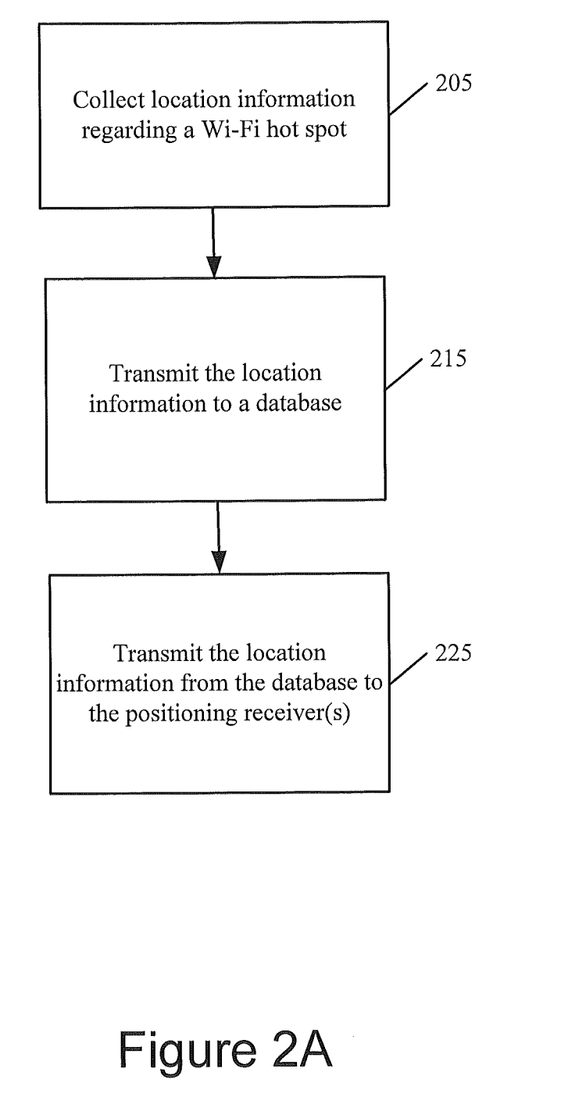
FIGS. 2A-2D are flowcharts illustrating operations of improving the performance of Wi-Fi-based location determination, according to various embodiments described herein.

Referring now to FIGS. 2A-2D, flowcharts are provided illustrating operations of improving the performance of Wi-Fi-based location determination, according to various embodiments described herein. Referring to FIG. 2A, the operations include collecting location information and/or identifier (e.g., model number, manufacturer name, model/device name, owner name, etc.) information regarding a Wi-Fi hot spot (Block 205). For example, the techniques described herein with respect to the listening devices 104, crowd-sourcing, and/or drive tests may be used to collect location and/or identifier information regarding one or more of the Wi-Fi hot spots 121-123. Next, this information may be transmitted (e.g., via one or more of the beacons 111-115, or via another network) to the central database 105 (Block 215). After updating the central database 105 with this information, it may be transmitted from the central database 105 to one or more of the positioning receivers 101 (Block 225).

Figure 2B:
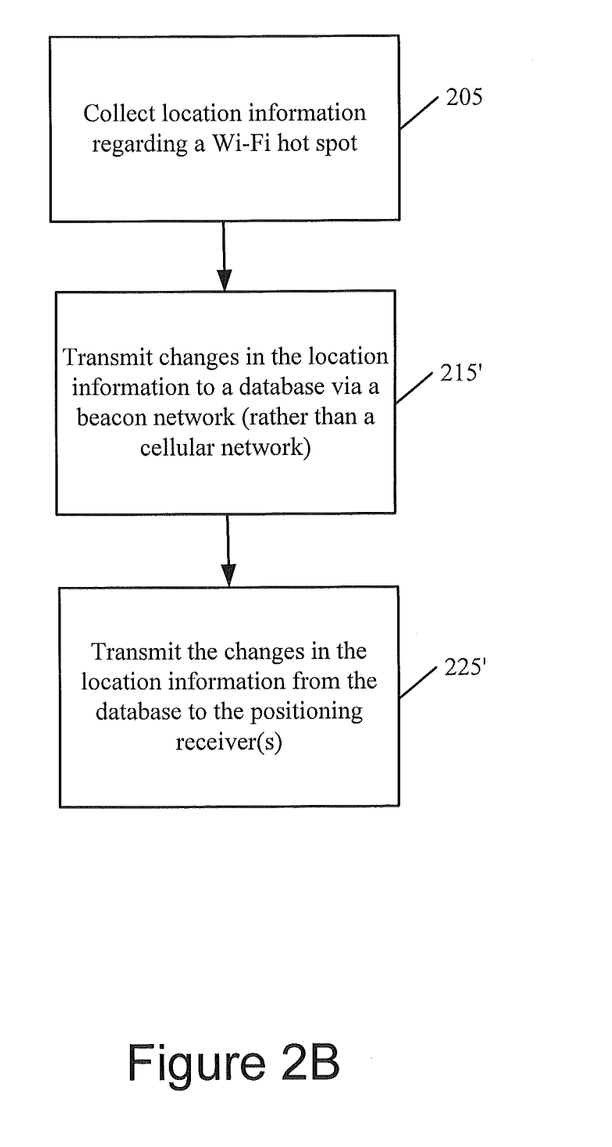

Referring to FIG. 2B, Block 205 from FIG. 2A is illustrated, along with Blocks 215' and 225', which are modified forms of Blocks 215 and 225, respectively, from FIG. 2A. In particular, Block 215' of FIG. 2B illustrates that, according to various embodiments, transmitting the information to the central database 105 may be embodied by transmitting changes (and perhaps only the changes) regarding the information. For example, the changes may be detected by comparing the information regarding the Wi-Fi hot spot 123 with previously-stored (e.g., at one or more of the LDs 104) information regarding the Wi-Fi hot spot 123. Moreover, Block 215' further illustrates that the Wi-Fi hot spot 123 status changes may be transmitted over a non-cellular beacon network (e.g., via one or more of the beacons 111-115). As a result, cellular network signaling capacity may be preserved for other uses (e.g., phone calls and/or Internet data). Moreover, Block 225' of FIG. 2B illustrates transmitting the changes from the central database 105 to the positioning receiver 101. Additionally, although FIG. 2B indicates the plural term "changes," it will be understood that a single detected change in the location of the Wi-Fi hot spot 123 may be reported to the central database 105 (Block 215') and transmitted from the central database 105 to the positioning receiver 101 (Block 225').

Figure 2C:
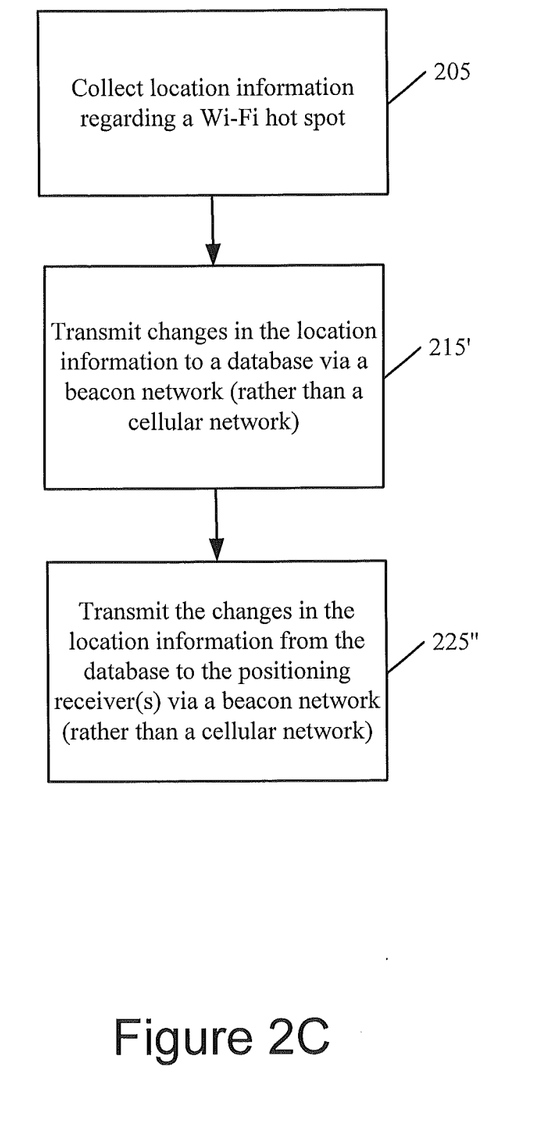

Referring to FIG. 2C, Blocks 205 and 215' from FIG. 2B are illustrated. Additionally, Block 225" is illustrated, which is a modified form of FIG. 2B's Block 225'. In particular, Block 225" of FIG. 2C illustrates that the changes may be transmitted from the central database 105 to the positioning receiver 101 over a beacon network (e.g., using one or more of the beacons 111-115, which may be WAPS beacons) rather than a cellular network. Alternatively, according to various embodiments, the changes may be transmitted from the central database 105 to the positioning receiver 101 over a cellular network.

Figure 2D:
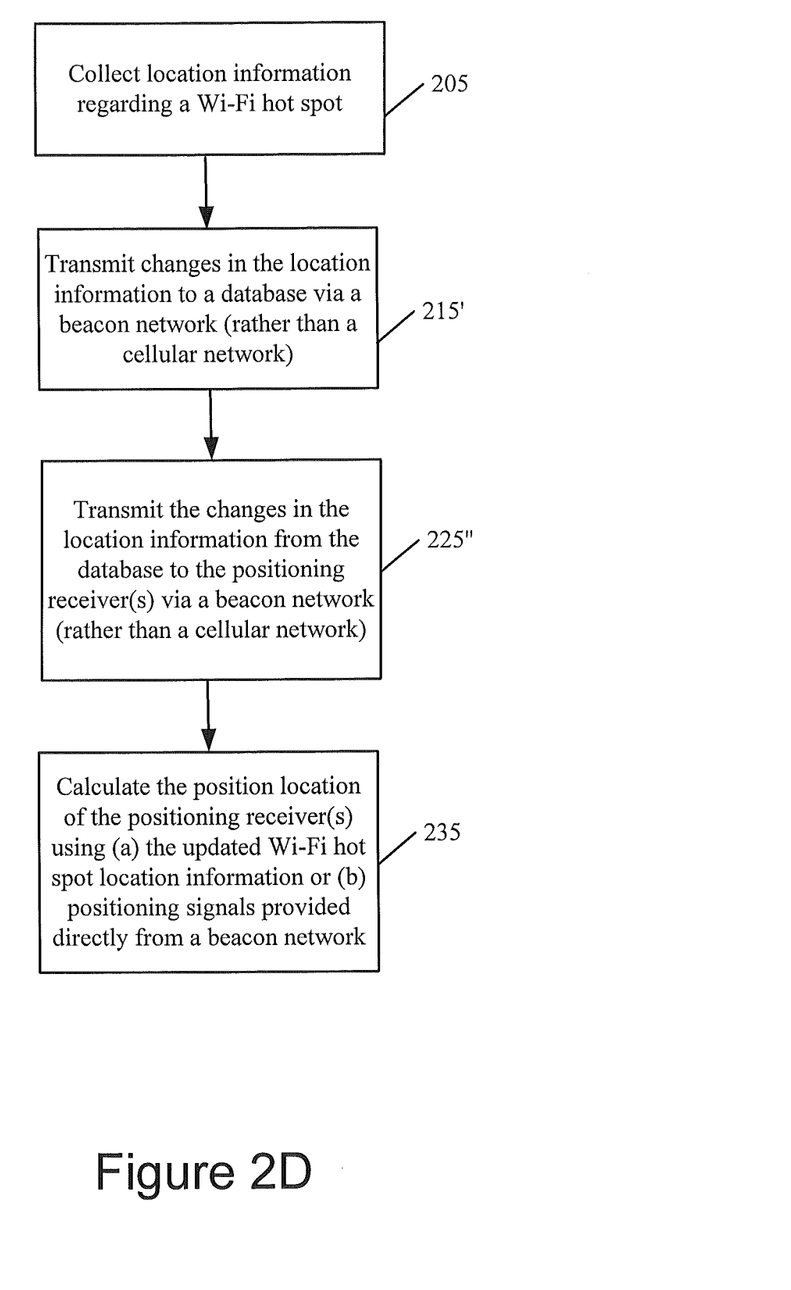

Referring to FIG. 2D, Blocks 205-225" from FIG. 2C are illustrated, along with Block 235. In particular, Block 235 of FIG. 2D illustrates calculating the position location of the positioning receiver 101 using the updated location status (e.g., regarding the Wi-Fi hot spot 123) provided by the central database 105. According to various embodiments, the positioning receiver 101 itself may calculate its position using this updated location status information. Additionally or alternatively, the positioning receiver 101 may determine (e.g., using the goodness matrix described herein) that it has greater confidence in positioning signals (e.g., GPS-like positioning signals) that are provided directly from one or more of the beacons 111-115 (which may be a part of a WAPS network) to the positioning receiver 101, regardless of the location of the Wi-Fi hot spot 123.

Various operations described herein may therefore provide several advantages, including:
1. Preservation of cellular network signaling capacity.
2. Faster location determination.
3. Preservation of battery power of the positioning receiver 101 due to fewer transmissions and faster time to find fix (TTFF).
4. Combinability with WAPS methods at the positioning receiver 101.

5. A WAPS network itself can be used to report the change in the status (i.e., location) of a Wi-Fi hot spot, thus obviating the need to use a cell phone network to report the status changes. This can be useful in the case of positioning receivers 101 that have a Wi-Fi connection and/or an Internet connection but lack cellular network capability.

6. It can be useful when a positioning receiver 101 that otherwise has cellular phone capability is in a coverage area of a Wi-Fi hot spot or in the coverage area of a WAPS network but is not in the coverage area of a cellular network.

A variety of different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed example embodiments of the invention. Although specific terms are employed, they are used in a generic and descriptive sense only and not for purposes of limitation, the scope of the invention being defined by the following claims.

What is claimed is:

1. A method of operating a positioning receiver, the method comprising:
   receiving, via a non-cellular terrestrial beacon network, location change information indicating a change in a location of a Wi-Fi hot spot, at the positioning receiver;
   determining whether the positioning receiver has greater confidence in the location change information or in positioning signals received by the positioning receiver using the non-cellular terrestrial beacon network; and
   calculating a position location of the positioning receiver using the one of the location change information or the positioning signals received by the positioning receiver using the non-cellular terrestrial beacon network in which the positioning receiver has the greater confidence.

2. The method of claim 1, wherein determining whether the positioning receiver has greater confidence in the location change information or in the positioning signals comprises:
   comparing confidence in the location change information with confidence in the positioning signals.

3. The method of claim 2, further comprising storing, in the positioning receiver, the confidence in the location change information.

4. The method of claim 3, wherein storing comprises:
   storing the confidence in the location change information along with Wi-Fi hot spot location and identifier information.

5. The method of claim 1, further comprising receiving the positioning signals from the non-cellular terrestrial beacon network at the positioning receiver.

6. A system for Wi-Fi-based location determination, the system comprising:
   a listening device configured to:
      receive signals from a Wi-Fi hot spot; and
      transmit location information of the Wi-Fi hot spot, only in response to a change in a status of the Wi-Fi hot spot, via a wide area non-cellular terrestrial beacon network comprising a plurality of beacons that are configured to transmit GPS-like signals for location determination of positioning receivers; and
   a database configured to:
      receive the location information of the Wi-Fi hot spot from the listening device, via the wide area non-cellular terrestrial beacon network; and
      transmit the location information of the Wi-Fi hot spot to a positioning receiver,
   wherein the positioning receiver is configured to receive the location information of the Wi-Fi hot spot via the wide area non-cellular terrestrial beacon network,
   wherein the positioning receiver is configured to calculate a position location of the positioning receiver, using one of:
      the location information of the Wi-Fi hot spot; or
      positioning signals received by the positioning receiver using the wide area non-cellular terrestrial beacon network, and
   wherein the positioning receiver is further configured to determine whether the positioning receiver has greater confidence in the location information of the Wi-Fi hot spot or in the positioning signals received by the positioning receiver using the wide area non-cellular terrestrial beacon network.

7. The system of claim 6, wherein the listening device is configured to detect a change in a strength of the signals from the Wi-Fi hot spot and to determine the change in the status of the Wi-Fi hot spot in response to the change in the strength of the signals from the Wi-Fi hot spot.

8. The system of claim 6, wherein the positioning receiver is configured to calculate the position location of the positioning receiver using the one of the location information of the Wi-Fi hot spot or the positioning signals received by the positioning receiver using the wide area non-cellular terrestrial beacon network in which the positioning receiver has the greater confidence.

9. The system of claim 6, wherein:
   the listening device comprises a first listening device;
   the system further comprises a second listening device configured to receive the signals from the Wi-Fi hot spot, and configured to transmit the location information of the Wi-Fi hot spot in response to detecting or failing to detect the signals from the Wi-Fi hot spot; and
   one of the first and second listening devices is installed at one of the plurality of beacons.

* * * * *